April 17, 1928.
P. F. MOFFETT
1,666,464
IMPLEMENT FOR TEACHING FINGERING
Filed May 16, 1927    2 Sheets-Sheet 2
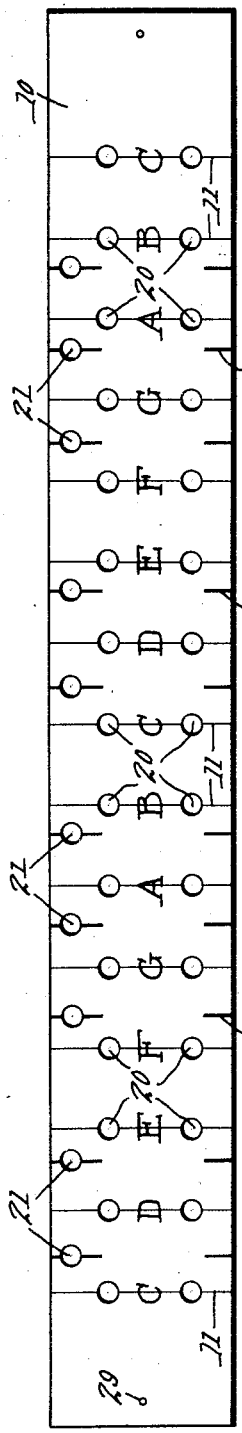
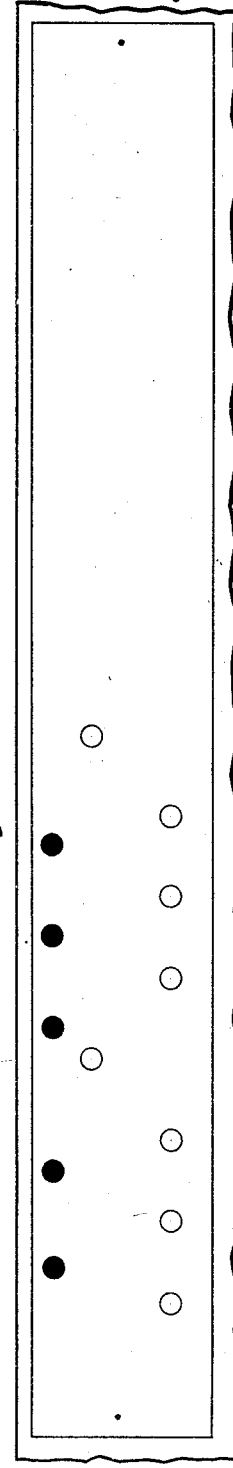
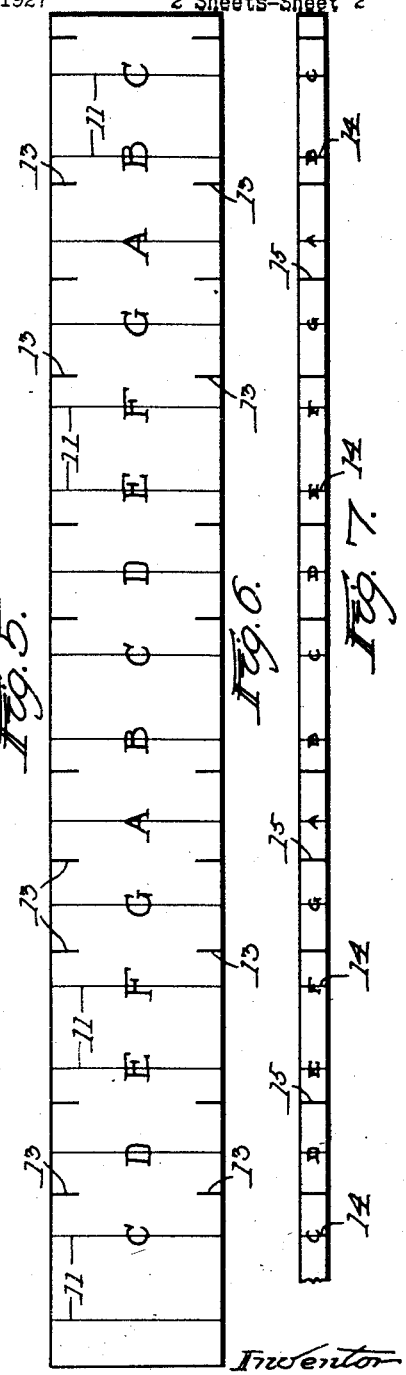
Inventor
Patrick F. Moffett
by attorneys
Southgate
Fay & Hanby Patented Apr. 17, 1928.

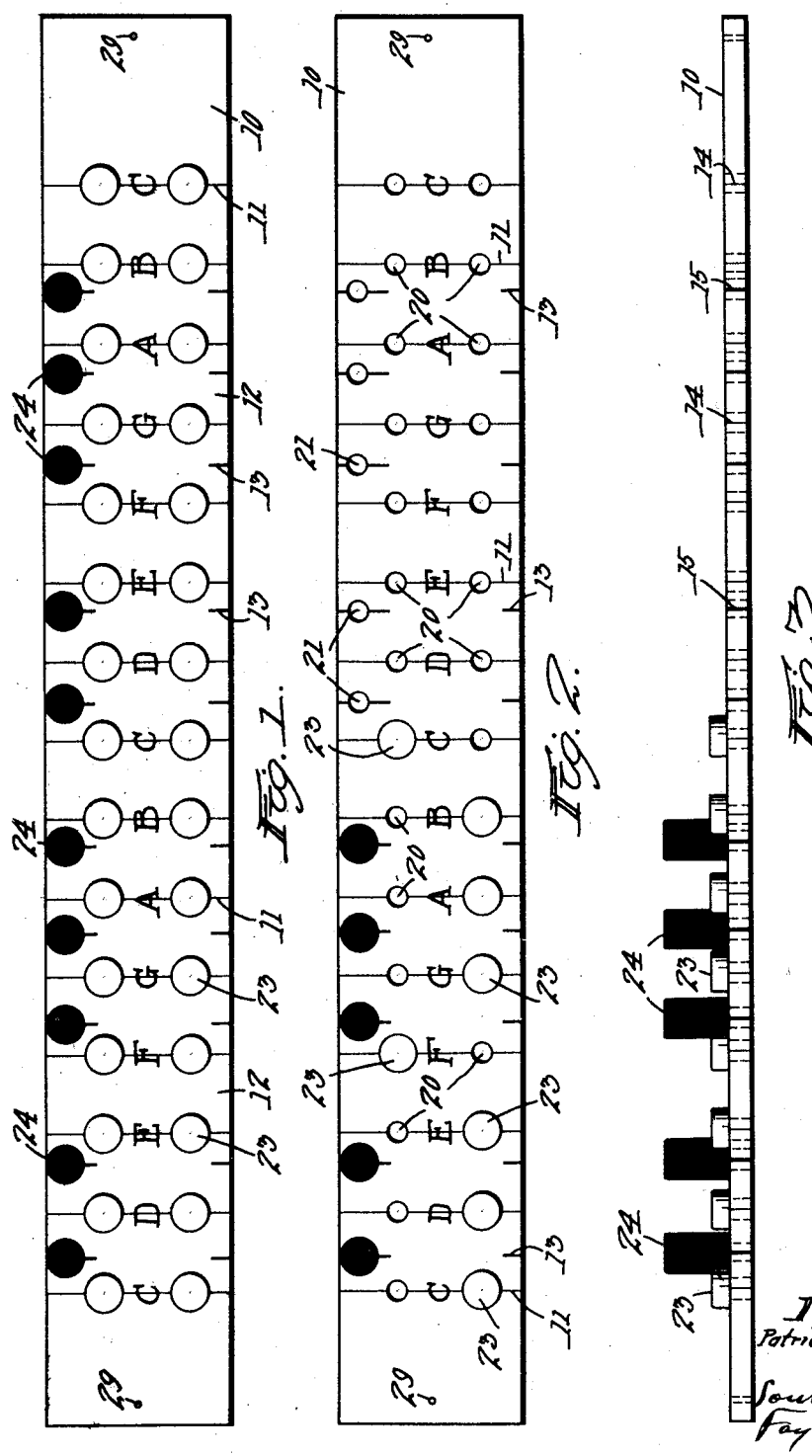

1,666,464

UNITED STATES PATENT OFFICE.

PATRICK F. MOFFETT, OF WORCESTER, MASSACHUSETTS.

IMPLEMENT FOR TEACHING FINGERING.

Application filed May 16, 1927. Serial No. 191,638.

This invention relates to an implement which can be used directly for teaching piano fingering and also can be used for providing on paper or the like a representation of the key-board of a piano with scales or chords marked thereon in exactly proper position for use in exercising the hands to enable the pupil to facilitate his playing of the same on the piano.

The principal objects of the invention are indicated in what I have already said. The invention also has for its objects to provide a simple and inexpensive device for those purposes; to provide a device of this character which can be easily and inexpensively made and used with equal facility and simplicity, and to secure the double means for drawing scales and chords on paper.

This invention provides an interesting means for holding the pupil's attention and keeping up interest in manual practice, besides assisting muscular development of the hand and adding to the flexibility. It also encourages pupils to write the scales and chords on paper, or a representation thereof, all of which adds to their familiarity with the subject.

Other advantages of the invention will appear hereinafter.

Reference is to be had to the accompanying drawings, in which

Fig. 1 is a plan of an implement embodying this invention showing it complete;

Fig. 2 is a similar view showing it in condition for use in practicing the fingering of the chromatic scale;

Fig. 3 is a front edge view of the same;

Fig. 4 is a view like Fig. 1, with all the detachable parts removed.

Fig. 5 is a view of a sheet of paper illustrating the representation of the same scale thereon, made by the aid of this implement;

Fig. 6 is a plan of a simplified form of the implement; and

Fig. 7 is an edge view of the same.

In the form of the invention shown in the first four figures, the implement is in the form of a strip 10 of wood or any convenient material. On the top surface are lines 11 spaced apart to provide between them spaces 12 of the same width as the white keys of a piano. The lines 11 represent the centers of the keys. Near one edge are black lines 13 arranged parallel with the lines 11 and in the proper places to indicate the positions of the centers of the black keys.

On the edge are black lines 13 arranged parallel with the lines 11 and in the proper places to indicate the positions of the centers of black keys. On the edge shown in Fig. 3 there are vertical lines 14 which are a continuation of the lines 11 and there are also black lines 15 which are in exact alignment with the black lines 13 and for the same purpose. The letters C, D, etc. appear on the front of the instrument for an obvious purpose, but they may be omitted, especially for advanced pupils.

In addition to this, the form shown in the first four figures is provided with a series of holes 20, two of them being located on each line 11 and with a series of holes 21 located preferably at the end of each line 13. These holes go through the board. The lower series of holes 20 are used chiefly for the thumbs. The implement can be used simply with these holes as showing where the fingers should be placed in playing as shown in Fig. 4, but I have provided a series of pins 23 having heads or discs and shanks. The shanks are placed in the holes 20 and the heads represent the areas to be struck by the fingers. Also pins 24 are similarly placed in and over the holes 21 to represent the areas in which the black keys have to be struck. The heads of the keys rest on the surface of the board. All these pins are readily removable and readily applicable to the device and they have to be placed in exactly the right position obviously. This represents the instrument itself.

In the last two figures I have shown a simpler instrument in which the lines 11, 13, 14 and 15 are the same as above described and the letters C, D, E, etc. may be employed. This instrument can be used for practice purposes. I have shown it as only two octaves long but it can be made any number of octaves. This is used to facilitate the playing of chords and scales as in the other case.

The method of using the instrument shown in the first four figures is exactly the same but there we have the discs which are more easily found and the pupil can readily become accustomed to the fingers exactly in the center of the various keys by practice with this form of the invention.

The device, in either of the forms shown or any form coming within the scope of this invention, can be used also for making graphic representations of chords and scales. The implement gives the proper spacings and the holes 20 and 21 constitute guides or templets by which the key to be struck can be indicated on paper by simply placing a pencil in these holes, one after the other, and marking the circles on the paper, which, of course, will be exactly the right distance apart to indicate both the white keys and the black keys. In the use of the invention for this purpose, the front edge surface of the rule can be used to make horizontal lines if desired. The board is placed on paper and held down with the left hand or by nails or tacks extending through two small holes 29 and then a pencil mark can be made entirely around the outside edges of the implement. Then the proper holes can be selected according to the chord or scale that is to be represented. The result is shown in Fig. 5, the same scale being shown as in Fig. 2. All the holes 20 and 21 can be indicated by placing a dot on the paper for each one. In the latter case practically a duplicate of this implement can be obtained, except that the letters have to be put on afterwards, if they are to be used, or they can be omitted when a pupil is far enough along for that.

This instrument in either of the forms shown or any form coming within the scope of this invention, is adapted to be used with great facility for the purpose of the fingering exercises and the exercising of the fingers so as to get them into a more elastic condition. It also has the effect of getting the pupil into the habit of holding the hands at the right angle and it is of such a nature as to stimulate interest and increase the amount of practice that the average pupil will do. Means is provided whereby chords and scales can be represented on a sheet of paper as indicated briefly in Fig. 5, a permanent record is secured to that the pupil can practice the same frequently without setting up the instrument every time. Even if the pupil's memory fails as to the keys to be struck he can practice with this record.

Although I have illustrated and described only two forms of the invention I am aware of the fact that modifications can be made therein by any person skilled in the art without departing from the scope of the invention as expressed in the claims.

Therefore, I do not wish to be limited to all the details of construction herein shown and described, but what I do claim is:

1. As an article of manufacture, an implement for the purpose described having a surface provided with parallel lines spaced the same distance apart as the keys of a piano, each line representing the center of a piano key, and lines on said surface representing the location of the center of the black keys, one edge having vertical lines thereon spaced the same as the lines on the top surface.

2. As an article of manufacture, an implement of the class described having holes extending all the way therethrough and spaced apart in the relative locations of the longitudinal center lines of a series of the white and black keys of a piano, for use in practice and drawing musical elements on a sheet of paper.

3. As an article of manufacture, an implement of the class described having holes therethrough in the relative locations of the centers of the white and black keys of a piano for use in practice in making musical elements on a sheet of paper, and headed pins adapted to be inserted in said holes to represent chords, scales directly on the instrument.

4. As an article of manufacture, an implement of the class described having holes therethrough in the relative locations of the centers of the white and black keys of a piano for use in practice in making musical elements on a sheet of paper, and means adapted to be held in said holes for indicating the positions to be struck by the fingers and thumbs respectively, the indicating means representing the black keys being at a greater elevation than the others.

In testimony whereof I have hereunto affixed my signature.

PATRICK F. MOFFETT.